Dec. 11, 1923.

T. B. HOPE 1,476,819

STOCK RECORD AND SALES ACCOUNTING SYSTEM

Filed April 14, 1921    2 Sheets-Sheet 1

Inventor:
Thomas B. Hope
By Chamberlin Brendenreich
Attys.

Dec. 11, 1923.
T. B. HOPE
1,476,819
STOCK RECORD AND SALES ACCOUNTING SYSTEM
Filed April 14, 1921　2 Sheets-Sheet 2
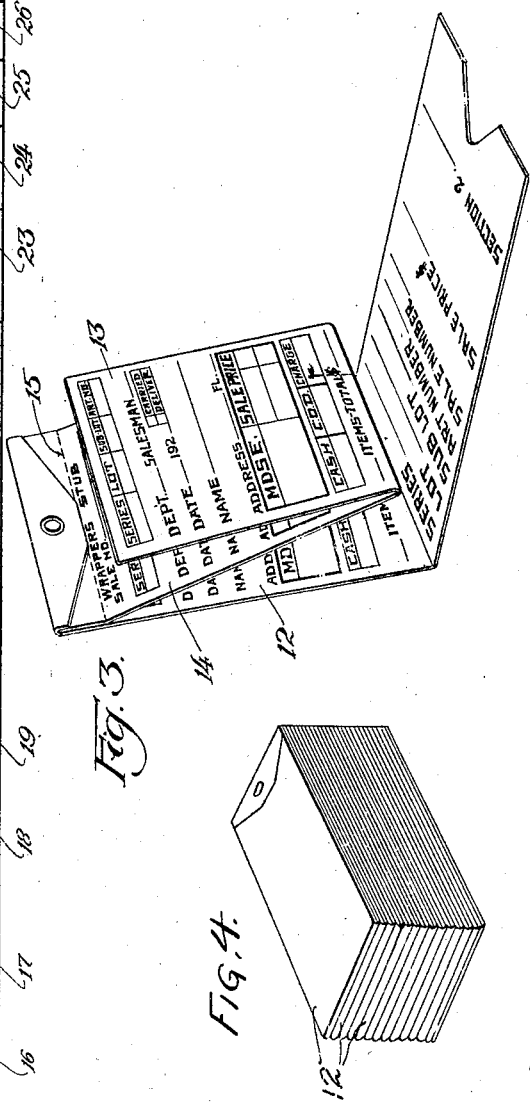

Patented Dec. 11, 1923.

1,476,819

UNITED STATES PATENT OFFICE.

THOMAS B. HOPE, OF CHICAGO, ILLINOIS.

STOCK-RECORD AND SALES-ACCOUNTING SYSTEM.

Application filed April 14, 1921. Serial No. 461,231.

*To all whom it may concern:*

Be it known that I, THOMAS B. HOPE, a citizen of the United States, residing at Chicago, county of Cook, State of Illinois, have invented a certain new and useful Improvement in Stock-Record and Sales-Accounting Systems, and declare the following to be a full, clear, and exact description of the same, such as will enable others skilled in the art to which it pertains to make and use the same, reference being had to the accompanying drawings, which form a part of this specification.

My invention has for its object to produce a novel combination of a few simple devices by means of which a complete unerring account of each and every article of any given lot of articles which may be purchased will be maintained until the final disposition thereof is made and will at all times show what disposition, if any, has been made, and the number of such articles which still remain.

Viewed in one of its aspects my invention may be said to have for its object to produce a simple and novel means for forming a complete and permanent record of all stock listed, simplifying inventory, facilitating frequent reliable stock reports, showing exact quantities and cost price of stock on hand or the actual amount of capital invested at any given time in any given lot or line of goods without making it necessary first to go through a stock listing operation or to refer to any other files or records than a simple record sheet forming one of the elements of my improved system.

The first transaction that takes place in connection with goods handled by a merchant, say a retailer, is the purchase of the goods. The goods are then received in the warehouse, they are inspected, are tagged and are then delivered to the selling department. In accordance with my invention, a simple and novel system is provided by means of which the facts concerning all these transactions and the subsequent disposal of the goods by the selling department may be recorded on a single sheet or, if the quantity of goods be great, upon a plurality of companion sheets, in such a way that all of the facts relating to a given lot of goods from the date of purchase to the date of final disposal of the last piece can be seen at a glance at any time; together with means for insuring accuracy of the record; and means for simplifying the labor involved in making adequate records.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a plan view of the stock and sales record sheet comprising one of the features of my invention, a portion of the sheet being broken away;

Fig. 2 is a plan view of the daily sales record sheet forming part of my improved system, a large part of the body of the sheet being broken away;

Fig. 3 is a perspective view of my enveloped combination record, invoice, receipt and shipping tag, partially unfolded, forming part of my system; and Fig. 4 is a perspective view of a stack of my improved tags.

The sheet on which the complete records from the time of purchase to the time of disposal of the goods are kept is shown in Fig. 1, being indicated as a whole by the letter A. This sheet contains at the top a space, 1, which, in the arrangement shown, is the rectangular space appearing at about the center of the sheet and bounded by heavy black lines and above which appears the legend "Purchase record." This space is suitably divided by lines into compartments which are marked with suitable legends which will enable the purchasing department to set down all of the necessary facts regarding the purchase of a lot of goods, including the time of purchase, the probable time and manner of the shipment, name and address of the manufacturer or jobber, and a description of the goods.

Thus, as soon as a lot of goods is purchased the first records are made on the sheet which is to contain the history of the goods up to the time of their final disposal. At the top of the sheet, beside the space 1, is another space, 2, marked "Receiving warehouse check" suitably sub-divided so as to permit the warehouse employees to mark therein the date of receipt of the goods, and the number and condition of the packages in which the goods are received. Below the space, 2, is a similar space, 3, marked "Tag department check." When the goods have been delivered to the tag department, the packages being opened and the individual pieces examined, a complete record may be kept in this space of the date when the goods are received, the condition of the individual pieces, the total number of the individual pieces, the number of individual pieces that are found to be damaged, the number of individual pieces that are returned, and the number that are tagged; the tags which the goods are to carry in the selling department being placed on the goods by the tag department. At any time before the goods are received in the warehouse the purchasing department gives to the goods a series character, a lot number and, if desirable, sub-lot numbers; there being provided on the record sheet a space, 4, in which these items are entered together with the cost price and the department to which the goods are to go. Below the space, 4, is a space, 5, in which the cost price of each piece in the various sub-lots and the sale price may be set down. Another space, 6, may be provided, conveniently below the space 1, in which to make records in case it be subsequently decided to reduce the sale price. Another space, 7, may be provided, conveniently below the space 3, to contain data as to the final accounting of the entire lot of goods after they have been finally disposed of. Below the space 7 there may be a space, 8, in which the names of the receiving clerks and tagging clerks may be written and, if desired, a space, 9, adapted to contain the total amount received for the goods, the total amount paid for the goods, and the difference between these two amounts. Below the spaces 5 and 6 there may be another space, 10, to receive the signature of the manager of the department in which the goods are to be sold. All of the spaces heretofore enumeratel are arranged at the top of the sheet, the lower portion of the sheet being divided into columns, 11, and being ruled along horizontal lines so as to divide each column into a large number of individual spaces which, in the arrangement shown, are numbered consecutively from 1 to 160; each of these spaces representing one article of goods. If there are one hundred sixty or less articles or pieces in a lot or sub-lot, a single sheet, such as shown, will take care of all of them but, if there are more and it is not desired to make a longer sheet, additional ruled sheets divided into columns similar to the columns 11 may be attached to the record sheet. The numbered spaces in the columns 11 do not extend entirely to the lower ends of the columns, room being left below these numbered spaces for a series of rather closely spaced horizontal lines providing at the foot of each column twelve spaces each marked with the name of one of the months of the year.

The second feature of my invention is shown in Fig. 3 and comprises a tag, 12, folded upon itself between its ends and containing a folded separable sheet made up of two leaves, 13 and 14, attached at one end to the tag so that it may easily be torn therefrom. In the arrangement shown, the sheet may be separated from the stub fastened to the tag, by tearing the sheet off along a perforated line, 15. The leaves 13 and 14 and the underlying portion of the tag are divided into suitable similar spaces and bear suitable similar legends giving the series, lot, sub-lot and article numbers, together with the usual information appearing on sales slips. These tags are filled in as to series, lots, sub-lot and article numbers in the tagging department and are there attached to the goods before the latter are delivered to the selling department.

After the purchasing department has decided upon the series and lot numbers it is preferable that the shipper be notified of these and be requested to mark the bales or crates or boxes with these numbers and also, if there be more than one package, to number the packages consecutively. The number of copies of each sheet that are made will of course vary according to the nature of the business and its organization but, for the sake of illustration, a specific example may be taken. Thus, the purchasing department may cause five copies of the purchase record sheet to be made on papers of different color, one for the purchasing department, one for the general manager, one for the auditor, one for the receiving warehouse, and one for the tagging department. These sheets need contain only that portion of sheet A comprising spaces 1 to 10 inclusive. The purchasing department will retain its copy for checking purposes, one copy will go directly to the general manager's file, and the other three copies will go to the receiving warehouse where all three will be held pending the arrival of the goods, the identity of which will be established by the series and lot number placed thereon by the shipper pursuant to instructions from the purchasing department. When the goods are received in the warehouse the space 2 in each of the three copies of the sheet will be filled in. The auditor's copy will then be sent to the purchasing department which will note on its copy, reserved for checking purposes, the various items added by the warehouse, after which the purchasing department will transmit the auditor's copy to the auditor; and the third copy will go direct to the general manager's office from the warehouse, where it will serve as official notice of a definite quantity and kind of merchandise being available for immediate sale and giving the general manager the same opportunity to check his copy of the purchase record sheet that was afforded the purchasing department by the auditor's copy. When a lot or line of merchandise has been selected from the warehouse file in the general manager's office to be placed on sale, the copy which was received by the general manager from the warehouse is transformed into a requisition, by means of a simple stamp or otherwise, and sent back to the warehouse which will then deliver to the tag department the specified lot in just the same condition as it was at the time of receipt in the warehouse; the warehouse retaining the requisition which forms a permanent warehouse record of the transaction, while the original warehouse copy of purchase record sheet accompanies the goods to the tagging department and on this defective or damaged articles unfit for sale, as well as shortages, if any, will be noted, the sheet being then forwarded to the auditing department.

When a requisition is issued by the general manager's office on the warehouse, as aforesaid, a combination stock record and sales accounting sheet, like the complete sheet shown in Fig. 1, is made up and forwarded to the tag department which, after unpacking, inspecting and checking the goods, classify the same into sub-lots and cause tags such as illustrated in Fig. 3 and numbered consecutively from 1 up, to be attached to the articles. When the goods have been classified and each piece thereof tagged and the total number comprising each lot and sub-lot noted on the complete stock record sheet, the goods are delivered to the department where the goods will be placed on sale, at which time the selling department manager will sign the accountant's copies of the stock record sheets which latter will be sent direct to the chief stock accountant and be by him bound into stock ledgers; from which ledgers the chief stock accountant will check each day's sales as will hereinafter be explained.

When a sale is made the salesmen, with the aid of two carbon sheets, will fill out the blanks on the sheets or leaves 12, 13 and 14 of the tag. The two leaves 13 and 14 are then detached and handed to the wrapper with the article which has been sold; the body of the tag remaining on the goods. The inspector or official wrapper, after comparing the data on the leaf 13 with that on the leaf 12 forming part of the body of the tag makes a record of the sale on the daily sales record sheet to be hereafter explained, and then forwards the connected leaves, 13 and 14, to the cashier who stamps, detaches and returns with change, if any, the official wrapper's stub which is the leaf 14. This wrapper's stub is then deposited by the official wrapper in a sealed receptacle to which access shall be had only by the chief stock accountant or his duly authorized assistant. The sheet on which the official wrapper records each sale is shown in Fig. 2 and is numbered as a whole, B. This sheet has a series of columns, 16, 17, 18 and 19, in which are adapted to be written the series, lot, sub-lot and article numbers and other columns, 20, 21 and 22, in which the nature of the sale, whether it be "Cash," "C. O. D.," or "Charge," together with the selling price, may be entered. The sheet is ruled horizontally and transversely of the columns, each horizontal space being numbered in consecutive order, so that each sale, as it is entered on the sheet, is numbered. The sales record sheet also preferably contains a series of columns indicated at 23, 24, 25, 26, 27 and 28, in which are adapted to be entered various items relating to goods returned or exchanged. At the top of the sheet there are a number of columns, 29, 30, 31 and 32, in which the various "Cash," "C. O. D.," "Charge" and "Refund" transactions appearing on the sheet and additions thereto may be totaled.

At the end of the day each official wrapper places in the sealed receptacle containing the official wrapper's stubs his daily sales record sheets. At the close of each day the chief stock accountant collects the sealed receptacles and, after opening them, checks the sales record sheets with the wrapper's stubs and, if no error is found, the wrapper's stubs will be assorted first by series and then by lots and sub-lots for the purpose of posting each day's sales into the stock record ledgers. As a matter of fact, if no errors have been made, the only checking that need be done is to count the wrapper's stubs and note that they bear the cashier's stamp. The posting is done by simply turning to the proper stock record sheets, one after another, and, by means of an ordinary date stamp, making an impression in one of the columns, 11, following the number in this column corresponding to the number borne by the wrapper's stub. In this way whenever an article has been sold it is automatically removed from the stock records by the impression made on the stock record sheet showing the date of sale thereof. Therefore, an inspection of the stock record sheet relating to any given lot of goods will at all times show just how many articles remain in stock.

The daily sales record sheets are preferably filled out in triplicate, one copy being placed in the sealed receptacle as heretofore explained, one copy being retained in the department as a receipt for depleted stock and future reference as it fully provides for articles exchanged or returned, and one copy going directly to the general manager who, from the sheets coming from the various wrapping stations, can cause a general report to be quickly compiled to show the exact number of sales made, the total amount of cash received, the number and amount of "C. O. D." sales and "Charge" sales for that particular day.

It will thus be seen that by employing my improved stock and sales record sheets, daily sales record sheets and combination tags, four very important branches of a retail business, namely, stock record, sales accounting, shipping and receipt for delivery, are covered in a most simple and advantageous way.

When properly filled out and attached to articles of stock, the combination record tags will contain and embody every facility and provide every means necessary for complete identification, sale, record of sale, shipping directions and an unquestionable receipt for delivery of goods; thus guiding the course and recording, as it occurs, each movement of each article in a definite, positive manner from the moment the same was tagged into stock until the article has been delivered into the hands and keeping of those who purchased and paid for the same. This is all accomplished without a single false motion, unnecessary move or the superfluous scratch of a pen or pencil.

I claim:

1. In a stock record and sales accounting system, a record sheet having a series of numbered spaces corresponding to the number of articles in a given group, and a series of tags adapted to be numbered similarly to an equal number of the aforesaid spaces, each tag containing two superimposed leaves for the purpose of permitting a duplicate sales record to be made, at least one of said leaves being detachable, and each of said leaves and said sheet having appropriately designated spaces to receive characters identifying said articles as belonging to the aforesaid group.

2. In a stock record and sales accounting system, a record sheet having a series of numbered spaces corresponding to the number of articles in a given group, and a series of tags adapted to be numbered similarly to an equal number of the aforesaid spaces, each tag comprising a body portion and two overlying detachable leaves constructed and arranged to permit the salesman to make a triplicate record of a sale, said tag and said leaves as well as said sheet containing appropriately designated spaces adapted to receive characters which identify the aforesaid articles as belonging to the aforesaid group.

3. In a stock record and sales accounting system, a record sheet having a series of numbered spaces corresponding to the number of articles in a given group, a series of tags adapted to be numbered similarly to an equal number of the aforesaid spaces, each tag containing two superimposed leaves for the purpose of permitting a duplicate sales record to be made, at least one of said leaves being detachable, and each of said leaves and said sheet having appropriately designated spaces to receive characters identifying said articles as belonging to the aforesaid group, together with a daily sales record sheet having thereon a group of parallel columns ruled transversely into spaces numbered consecutively from top to bottom, there being columns marked with suitable legends indicating that the spaces in one column are adapted to contain identifying characters as aforesaid while other columns are to contain the amount of money paid, the amount of a "C. O. D." sale and the amount of a "Charge" sale.

4. A stock and sales record sheet having distributed across the top thereof a group of spaces marked with suitable legends to permit the entry of various data relating to the purchase of a lot of goods, the classification to be made of such goods, facts concerning the receipt of the goods prior to unpacking the same, and facts concerning the goods after they have been unpacked and tagged, said sheet containing below said spaces a series of parallel columns each divided into spaces by horizontally ruled lines, the latter spaces being numbered consecutively from the top of the first column to the bottom of the last column, and a plurality of tags containing suitably designated spaces adapted to receive numbers similar to a corresponding number of the aforesaid numbered spaces.

5. A stock and sales record sheet having distributed across the top thereof a group of spaces marked with suitable legends to permit the entry of various data relating to the purchase of a lot of goods, the classification to be made of such goods, facts concerning the receipt of the goods prior to unpacking the same, and facts concerning the goods after they have been unpacked and tagged, said sheet containing below said spaces a series of parallel columns each divided into spaces by horizontally ruled lines, the latter spaces being numbered consecutively from the top of the first column to the bottom of the last column, said sheet containing below each of said columns an extension divided into twelve spaces arranged one above the other and each bearing the name of one of the months of the year, and a plurality of tags containing suitably designated spaces adapted to receive numbers similar to a corresponding number of the aforesaid numbered spaces.

6. An element in a combination stock record and sales accounting system comprising a tag folded upon itself midway between its ends, said tag containing between the two halves thereof two detachable leaves, said leaves and the underlying half of the tag being suitably constructed and arranged to permit a triplicate record of a sale to be made.

In testimony whereof, I sign this specification.

THOMAS B. HOPE